UNITED STATES PATENT OFFICE.

GEORGE HARVEY SMITH, OF NEW YORK, N. Y.

FERTILIZER AND METHOD OF MAKING SAME.

SPECIFICATION forming part of Letters Patent No. 705,462, dated July 22, 1902.

Application filed December 16, 1901. Serial No. 86,072. (No specimens.)

*To all whom it may concern:*

Be it known that I, GEORGE HARVEY SMITH, a citizen of the United States, residing in the city of New York, borough of Manhattan, county and State of New York, have invented an Improved Fertilizer and Process of Manufacturing Same, of which the following is a specification.

My invention relates to fertilizers, more particularly to that class of fertilizers produced from night-soil or excreta, and has for its object to produce an effective, inexpensive, and practically odorless fertilizer in powder form from night-soil or excreta by a simple process, the resultant product besides being free from objectionable odors being non-combustible.

In carrying out my improved process I proceed as follows: To about thirty-two kilos night-soil or excreta I add about four kilos phenol, (anhydrous carbolic acid,) about eight kilos calcium carbonate, and about six kilos alumina silicate and thoroughly mix the same. I then slowly dry this mixture in shallow pans, preferably by air-exposure, after which the resultant mass is ground to a fine powder, preferably by means of centrifugal plates. The resultant powder is deprived of its objectionable odors by the action of the phenol (anhydrous carbolic acid) in arresting fermentation. Nitrogen is absorbed from the effluent by the hygroscopic action of the calcium carbonate. The alumina silicate distributes or equalizes the phenol employed.

The main ingredient in my proposed fertilizer is the phenol above described, as it is the active agent in arresting fermentation or holding in suspension all the valuable properties originally contained in the excreta or night-soil.

The resultant powder produced by my process is a highly-efficient practically odorless fertilizer which can be safely handled and packed for shipment, being non-combustible, and experiments have demonstrated that insects—such as the potato-bug, cabbage-worms, and the like—will not make their appearance where this improved fertilizer is seasonably employed.

Having described my invention, what I claim, and desire to secure by Letters Patent, is—

1. The process of making fertilizer, consisting in mixing night-soil, phenol, calcium carbonate and alumina silicate in about the proportions specified, then slowly drying the mixture by air-exposure, and then grinding the same to a fine powder, substantially as described.

2. A fertilizer consisting of dried and ground night-soil, phenol, calcium carbonate and alumina silicate in about the proportions specified.

GEORGE HARVEY SMITH.

Witnesses:
   HENRY STARCK,
   ABRAHAM B. LEVY.